(12) United States Patent
Ding et al.

(10) Patent No.: US 10,723,029 B2
(45) Date of Patent: Jul. 28, 2020

(54) SAFETY PROTECTION METHOD OF DYNAMIC DETECTION FOR MOBILE ROBOTS

(71) Applicant: Zhejiang Guozi Robot Technology Co., Ltd., Hangzhou, Zhejiang (CN)

(72) Inventors: Meng Ding, Hangzhou (CN); Yikun Tao, Hangzhou (CN); Xia Wang, Hangzhou (CN); Xudong Mi, Hangzhou (CN); Lingfen Zhu, Hangzhou (CN); Hongbo Zheng, Hangzhou (CN); Xinfeng Du, Hangzhou (CN); Jizhong Shen, Hangzhou (CN)

(73) Assignee: ZHEJIANG GUOZI ROBOT TECHNOLOGY CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 15/305,346

(22) PCT Filed: Oct. 8, 2016

(86) PCT No.: PCT/CN2016/101509
§ 371 (c)(1),
(2) Date: Oct. 19, 2016

(87) PCT Pub. No.: WO2018/064817
PCT Pub. Date: Apr. 12, 2018

(65) Prior Publication Data
US 2018/0333869 A1 Nov. 22, 2018

(51) Int. Cl.
*G06F 19/00* (2018.01)
*B25J 19/06* (2006.01)
(Continued)

(52) U.S. Cl.
CPC .............. *B25J 19/06* (2013.01); *B25J 5/00* (2013.01); *B25J 9/0084* (2013.01); *B25J 9/1676* (2013.01);
(Continued)

(58) Field of Classification Search
CPC ... B25J 19/06; B25J 5/00; B25J 9/0084; B25J 9/1676; B25J 19/021; B25J 19/026; G05B 19/00; G05D 1/02
(Continued)

(56) References Cited

U.S. PATENT DOCUMENTS 8,571,742 B2 10/2013 Takeoka
9,981,383 B1 * 5/2018 Nagarajan .............. B25J 9/1666
(Continued)

FOREIGN PATENT DOCUMENTS

CN 1883887 A 12/2006
CN 101077578 A 11/2007
(Continued)

OTHER PUBLICATIONS

International Search Report for Application No. PCT/CN2016/101509 dated Jul. 7, 2017.
(Continued)

*Primary Examiner* — Ronnie M Mancho
(74) *Attorney, Agent, or Firm* — Jenkins, Wilson, Taylor & Hunt, P.A.

(57) ABSTRACT

The present invention discloses a safety protection method of dynamic detection for mobile robots. The mobile robot is provided with a sensor. Said sensor obtains the obstacle information in the detection areas in front of a mobile robot, and the mobile robot is caused to progressively slow down and dynamically adjust the detection area when an obstacle appears in the detection area. If no obstacle is detected in the detection area after adjusting, then the mobile robot is
(Continued)

caused to keep on moving, and if an obstacle is still detected in the detection area after adjusting, then the mobile robot is caused to keep on decelerating until they are stopped. The sensor sets different detection areas according to the traveling speed and traveling direction of the mobile robot, or presets the detection area according to the path and dynamically adjusts it when the mobile robot is running. The safety protection method of dynamic detection for mobile robots of the present invention enables a mobile robot to pass through a path with many obstacles, having good capability of anti-interference and meanwhile ensuring the consistency of the detection range and processing mechanism at curved and linear paths.

5 Claims, 2 Drawing Sheets

(51) Int. Cl.
B25J 9/00 (2006.01)
B25J 19/02 (2006.01)
B25J 5/00 (2006.01)
G05D 1/02 (2020.01)
B25J 9/16 (2006.01)

(52) U.S. Cl.
CPC ........... *B25J 19/021* (2013.01); *B25J 19/026* (2013.01); *G05D 1/0214* (2013.01); *G05B 2219/31002* (2013.01); *G05B 2219/50393* (2013.01)

(58) Field of Classification Search
USPC ................................................. 700/245, 248
See application file for complete search history.

(56) References Cited

U.S. PATENT DOCUMENTS

| 10,018,744 | B2* | 7/2018 | Roy ..................... H02J 17/00 |
| 2006/0173577 | A1* | 8/2006 | Takeda ..................... G06T 7/20 700/245 |
| 2007/0192910 | A1* | 8/2007 | Vu ........................... B25J 5/007 700/245 |
| 2008/0040040 | A1* | 2/2008 | Goto ..................... G05D 1/024 701/301 |
| 2008/0231221 | A1 | 9/2008 | Ogawa |
| 2009/0043440 | A1* | 2/2009 | Matsukawa .......... G05D 1/0214 701/25 |
| 2011/0202247 | A1 | 8/2011 | Takeoka |
| 2011/0298579 | A1* | 12/2011 | Hardegger ................ F16P 3/14 340/3.1 |
| 2013/0201292 | A1* | 8/2013 | Walter ..................... F16P 3/14 348/47 |
| 2016/0274784 | A1* | 9/2016 | Yui ....................... B25J 9/1658 |

FOREIGN PATENT DOCUMENTS

| CN | 102156474 A | 8/2011 |
| CN | 103576686 A | 2/2014 |
| CN | 104808671 A | 7/2015 |
| CN | 105487536 A | 4/2016 |
| CN | 106363668 A | 2/2017 |
| CN | 106374257 A | 2/2017 |
| JP | H 01222889 A | 9/1989 |
| JP | H 10187243 A | 7/1998 |
| JP | 2011145975 A | 7/2011 |

OTHER PUBLICATIONS

International Preliminary Report on Patentability and Written Opinion for Application No. PCT/CN2016/101509 dated Apr. 9, 2019.

* cited by examiner

SAFETY PROTECTION METHOD OF DYNAMIC DETECTION FOR MOBILE ROBOTS

FIELD OF THE INVENTION

The present invention relates to the field of mobile robots and, more particularly, to a safety protection method of dynamic detection for mobile robots.

DESCRIPTION OF THE PRIOR ART

Mobile robots are machinery that can automatically perform tasks, and they can either be commanded by a human being, or run programs written beforehand. Their mission is to assist or replace people in working, for example, in production industries, construction industries, or other dangerous works. In the process of the mobile robots performing tasks, it is usually required to sense the obstacles in the traveling path and avoid them. That is to say, a real time detection is required in the process of the movement of the mobile robot movement, and the obstacle detection areas are generally one stop zone and one deceleration zone. When obstacles are detected in the deceleration zone, the mobile robot will decelerate, and when obstacles are detected in the stop zone, the robot will be stopped. Usually, a larger stop zone is statically set up to guarantee that the robot will completely stop when it collides with the obstacle.

The setup of the static stop zone can desirably protect the mobile robot from colliding, however, it may also make the passing requirements of mobile robots higher, resulting in that some specific areas cannot be passed. Therefore, those skilled in the art desire to research and develop a safety protection method for mobile robots with lower passing requirements and higher efficiency.

SUMMARY OF THE INVENTION

In view of the above-mentioned drawbacks in the prior art, the technical problem to be solved by the present invention is to provide a safety protection method for mobile robots with lower passing requirements and higher efficiency.

In order to attain the above-mentioned goals, the present invention provides a safety protection method of dynamic detection for mobile robots, and, specifically, the technical scheme provided by the present invention is as follows:

A safety protection method of dynamic detection for mobile robots, wherein a mobile robot is provided with a sensor obtaining obstacle information in a detection area in front of the mobile robot, causing the mobile robot to progressively decelerate when an obstacle appears in the detection area, and the detection area is dynamically adjusted; if no obstacle is detected in the detection area after adjusting, then the mobile robot is caused to keep on moving; if an obstacle is still detected in the detection area after adjusting, then the mobile robot is caused to keep on decelerating until it stops.

Preferably, the detection area is divided into a stop zone that is close to the mobile robot and a deceleration zone in front of the stop zone.

Preferably, dynamically adjusting the detection area comprises progressively decreasing the area of the detection area of sensor.

Furthermore, the progressively decreasing of the area of the detection area of the sensor is a proportional decreasing.

Furthermore, the maximum detection width of the detection area vertical to the direction of movement of the mobile robot is greater than the width of the mobile robot.

Preferably, the detection area has a rectangle shape by default. When the mobile robot is in a turning status, the direction, curvature and shape of the detection area are adjusted according to the traveling direction and the magnitude of the angular velocity of the mobile robot.

Preferably, there are a plurality of sensors, each provided with different detection distances, the mobile robot dynamically adjusting the detection area by switching the combination pattern of the sensors.

Furthermore, said sensors comprise photoelectric sensors and/or laser sensors and/or visual sensors and/or ultrasonic sensors.

Preferably, the mobile robot presets the parameters of the detection area of different sections of a path according to the condition of the path.

The present invention also provides a safety protection method of dynamic detection for mobile robots, the mobile robot is provided with a sensor for obtaining the obstacle information in a detection area in front of the mobile robot, said sensor is provided with different detection areas according to the traveling speed and traveling direction of the mobile robot.

The safety protection method of dynamic detection for mobile robots that is provided by the present invention sets up different detection areas according to the different traveling speeds, directions and paths, enabling mobile robots to pass through the paths with many obstacles, having good capability of anti-interference. The special detection area can be customized for special paths, special demands, and meanwhile the consistency of the curved and linear detection ranges and the processing mechanisms can also be ensured.

The method and the technical effects of the present invention will be further illustrated below in conjunction with the accompanying drawings, in order to fully understand the objects, features and effects of the present invention.

DETAILED DESCRIPTION OF THE PREFERRED EMBODIMENTS

Figure 1:
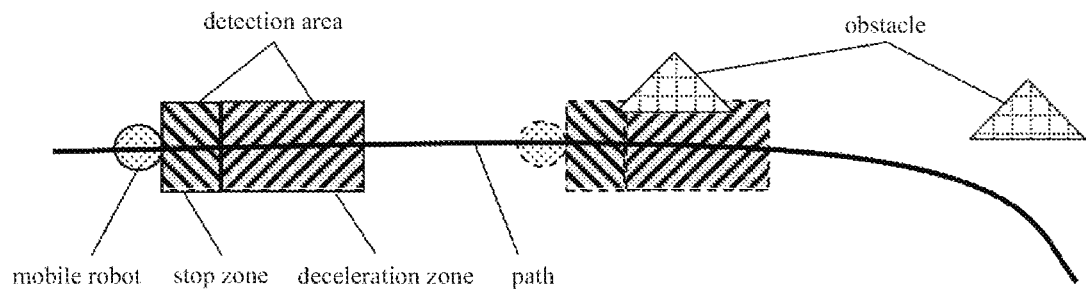
FIG. 1 is a schematic diagram of a conventional static detection area of a mobile robot.

It is usually necessary to perform obstacle detection for mobile robots in the process of movement. When the detection area is inappropriately set, the robot cannot pass through the path in some circumstances. Shown in FIG. 1 is a schematic diagram of mobile robots meeting with obstacles in the conventional statical detection areas (in which, the circles denote mobile robots, the black solid lines denote the paths, the triangles or rectangles with grid shading denote obstacles, the left and right rectangles with shadow shadings denote the deceleration zones and the stop zones, respectively; robots will stop when obstacles are detected inside the stop zones, and they will decelerate smoothly when obstacles are detected inside the deceleration zones, the denotations are the same in FIG. 2-4). As seen from FIG. 1, when obstacles are detected in the deceleration zones, mobile robots will decelerate, and when obstacles enter into the stop zones, mobile robots will stop moving.

Figure 2:
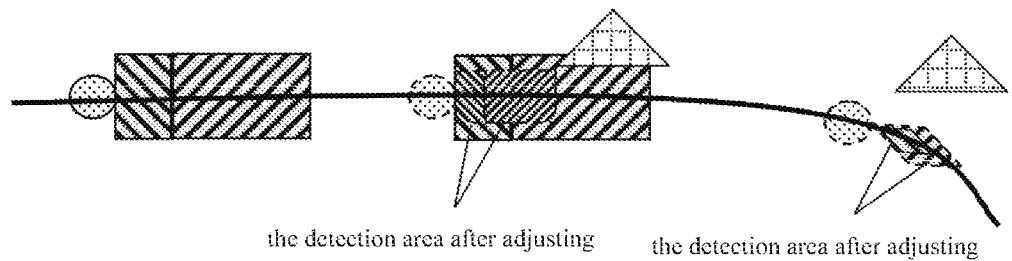
FIG. 2 is a schematic diagram of a dynamic detection area in a preferred embodiment of the present invention.

However, in the present invention, by dynamic setting of the detection areas, tolerance values towards the passing conditions are increased, and passing requirements are lowered, avoiding the problem of impassability in some special paths. By modelizing and generalizing the detection areas of robots, the different detection areas can be set according to the different travel directions and the different traveling speeds of mobile robots, and the requirements for performing special customization to special paths can also be met. All these three cooperating with one other, and comprehensively taking into consideration the factors such as vehicle velocities, vehicle postures, road conditions, safe, reliable road obstacles detection and protection mechanism for robots can be achieved. Shown in FIG. 2 is a schematic diagram of the dynamic detection areas in a preferred embodiment of the present invention in the same running condition as in FIG. 1. When obstacles are detected in the deceleration zone of the detection area of mobile robots, mobile robots will decelerate and dynamically adjust the detection area, as seen from FIG. 2, and no obstacles are detected in the detection area after dynamically adjusting, mobile robots can keep on moving according to the original specified path. Therefore, when a number of interfering objects are detected in the path, the mobile robots moving in normal speed will decelerate first when detecting the obstacles, and then progressively decrease detection areas by switching detection area under slow speeds, thus allowing robots to smoothly pass through the paths with rigorous operating environments. In other embodiments, adjusting of the detection area can also be achieved by setting different detection distances for a plurality of sensors. For example, when photoelectric, laser, visual or ultrasonic sensors are used, different detection distances can be dynamically set for a plurality of sensors, and changing of detection areas can be achieved by dynamic combination of the turn-on or turn-off of these sensors. In practical applications, two groups of photoelectric, laser, visual or ultrasonic sensors can be installed in the direction of advance, with various combinations having different detection distances, and these two groups can be switched over according to the velocities of advancing of robots. With regard to sensors mounted on different positions of mobile robots, under different moving conditions, sensors on specific positions can be turned on for protecting. For example, sensors mounted on front positions are enabled to take effect when advancing, and sensors mounted on rear positions are enabled to take effect when retreating; sensors mounted on left front positions are enabled to take effect when turning left and advancing, and sensors mounted on right front positions are enabled to take effect when turning right and advancing.

Secondly, the shapes of the detection areas can be changed synchronously with regard to the different travel directions of mobile robots. In the process of movement, if the detection areas during direct movement and turning are not accordingly adjusted, inconsistency of motion situations will be caused between the direct movement and turning movement due to the changes of vehicle postures of robots when turning. By adjusting the directions, curvatures and shapes of the detection areas according to different travel directions and magnitudes of angular velocities, safe, normal passing can be guaranteed. As shown in FIG. 2, when mobile robots are turning, the parameters of the detection area are dynamically adjusted according to the traveling directions and the magnitudes of the angular velocities of mobile robots. The diamonds as shown in the figures are only schematic, and the detection areas can also be set to other shapes, as long as it is guaranteed that the mobile robots can safely pass through the paths they are in. Of course, preferably, the maximum detection widths of the detection areas vertical to the direction of moving of the mobile robots is not smaller than the widths of mobile robots.

Figure 3:
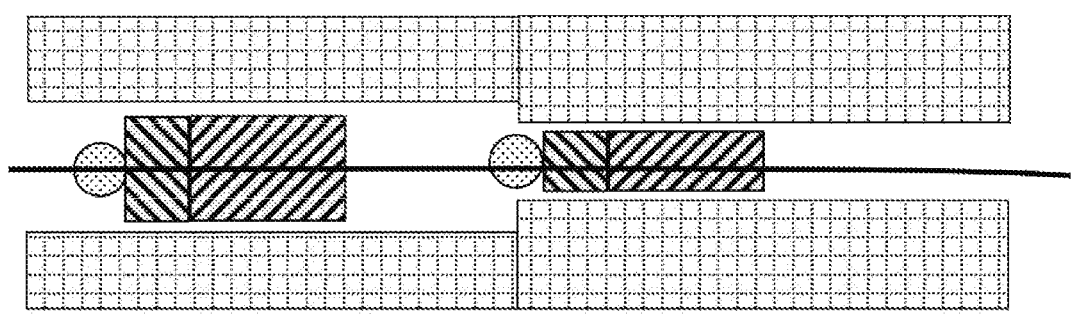
FIG. 3 is a schematic diagram of dynamically adjusting the detection area at each section of the road according to the path in a preferred embodiment of the present invention.

Moreover, with regard to the paths with special road conditions or with special demands, by adjusting various parameters of detection ranges, special detection areas can be customized to satisfy the special requirements of paths. Shown in FIG. 3 is a schematic diagram of dynamically adjusting detection areas of each section of the road according to the path. By presetting different detection areas for mobile robots according to road condition information of different sections of roads, for instance, when mobile robots need to pass through narrow roadways, the widths of detection areas are dynamically adjusted to narrow, to adapt to special paths of roadways, enabling mobile robots to safely pass through.

Figure 4:
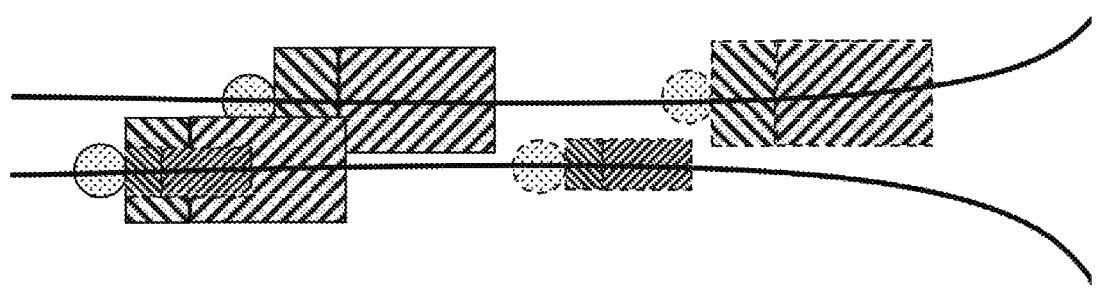
FIG. 4 is a schematic diagram of dual vehicle dispatching utilizing a dynamic detection area.

In practical applications, if mobile robots adopt the method for dynamically adjusting the detection area of the present invention, when two mobile robots dispatch on meeting, it is not necessary for one of them to wait to finish the dispatching of both vehicles, which greatly increases the efficiency of dispatching. As shown in FIG. 4, when the mobile robot on the lower part detects that there is another mobile robot in the deceleration zone in the front, it causes detection area to be decreased while decelerating, and there are no robots in the upper part inside the detection areas after the dynamic adjustment, which means that the robot in the lower part can safely pass through without waiting.

The preferred specific embodiment of the invention has been described in detail above. It is to be understood that numerous modifications and variations can be made by those ordinary skilled in the art in accordance with the concepts of the present invention without any inventive effort. Therefore, the technical solutions that may be derived by those skilled in the art according to the concepts of the present invention on the basis of the prior art through logical analysis, reasoning and limited experiments should be within the scope of protection defined by the claims.

The invention claimed is:

1. A safety protection method of dynamic detection for mobile robots, wherein a mobile robot is provided with a sensor obtaining obstacle information in a detection area in front of the mobile robot, wherein the detection area is divided into a stop zone that is close to the mobile robot and a deceleration zone in front of the stop zone, the method comprising:
   causing the mobile robot to stop when an obstacle appears in the stop zone; and
   causing the mobile robot to progressively decelerate and the detection area is dynamically adjusted when an obstacle appears in the deceleration zone; if no obstacle is detected in the detection area after adjusting, then the mobile robot is caused to keep on moving; if an obstacle is still detected in the detection area after adjusting, then the mobile robot is caused to keep on decelerating until it stops;
   wherein dynamically adjusting the detection area comprises progressively decreasing an area of the detection area of the sensor;

wherein the progressively decreasing of the area of the detection area of the sensor is a proportional decreasing; and wherein a maximum detection width of the detection area vertical to a direction of movement of the mobile robot is greater than a width of the mobile robot.

2. The safety protection method of dynamic detection for mobile robots according to claim 1, wherein, when the mobile robot is in a turning status, a direction, curvature and shape of the detection area are adjusted according to the direction of movement and a magnitude of an angular velocity of the mobile robot.

3. The safety protection method of dynamic detection for mobile robots according to claim 1, wherein there are a plurality of sensors, each provided with different detection distances, the mobile robot dynamically adjusting the detection area by switching a combination pattern of the plurality of sensors.

4. The safety protection method of dynamic detection for mobile robots according to claim 3, wherein said sensors comprise photoelectric sensors and/or laser sensors and/or visual sensors and/or ultrasonic sensors.

5. The safety protection method of dynamic detection for mobile robots according to claim 1, wherein the mobile robot presets parameters of the detection area of different sections of a path according to a condition of the path.

* * * * *